May 2, 1933. O. J. CROWE 1,907,044
FILLER STRIP FOR MOTOR VEHICLES
Filed April 10, 1931

INVENTOR
Orley J. Crowe.
BY
Harness, Dickey, Pierce & Hann,
ATTORNEYS.

Patented May 2, 1933

1,907,044

UNITED STATES PATENT OFFICE

ORLEY J. CROWE, OF DETROIT, MICHIGAN

FILLER STRIP FOR MOTOR VEHICLES

Application filed April 10, 1931. Serial No. 529,206.

My invention relates to a filler strip for motor vehicles and it has particular relation to a filler strip adapted to be interposed between two metallic surfaces as a cushion or insulator.

The main objects of my invention are, to provide an anti-squeak filler strip, to be employed in the manufacture of motor vehicles, that is more durable than similar articles heretofore employed; to provde a metallic filler strip that is extremely flexible and that can be employed as freely as the binding heretofore employed; to provide a filler strip having a portion thereof impregnated with a lubricating medium, thereby providing a more efficient union between the members bonded together than has been possible heretofore; to provide a filler strip with a metal cover for the portion thereof beyond the bonded members, the metal cover being finished to enhance the appearance of the motor vehicle.

Prior to my invention, filler strips employed between metal parts of a motor vehicle for obviating noises, were composed entirely of fabric. This type of filler strip while it has been employed extensively, has never proved entirely satisfactory, because after the filler strip is interposed between the metal portions of the vehicle, and the metal portions are secured together, the original thickness of the filler strip is materially reduced, and then after a very short time, due to vibration and the like ordinarily occurring in a motor vehicle, the metal members separate slightly with the result that the filler fails to perform the function for which it was intended. In addition to this, the portion of the filler exposed to the weather elements, soon become cracked or otherwise defective, with the result that an aperture is provided through which water for example may enter.

In my invention an anti-squeak filler strip is provided, which is adapted to be interposed between two metal surfaces, irrespective of their contour. Furthermore, a filler constructed in accordance with my invention will maintain its uniform thickness, thereby providing an element between the metal members secured together, and will prevent water from seeping between them. One form of the filler strip provided comprises a rubber or fabric inner member, having an enlarged portion at one edge thereof, and a thin flexible metallic covering substantially incasing the fabric member. The metal covering seals the aperture between the metal members, in a more durable manner.

For a better understanding of my invention, reference may now be had to the accompanying drawing, forming a part of this specification, in which Fig. 1 is a fragmentary elevational view of a motor vehicle, disclosing an anti-squeak filler strip constructed in accordance with my invention.

Figure 3:
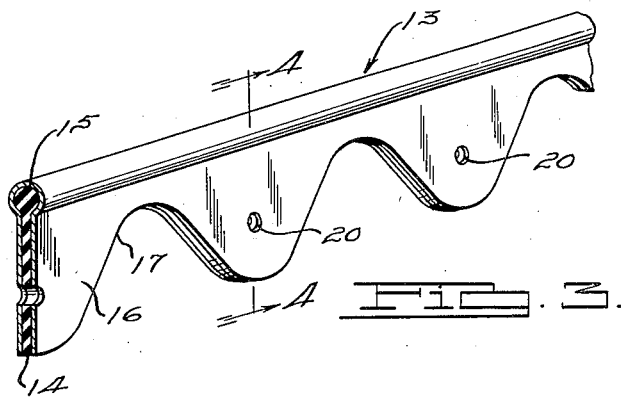
Fig. 3 is an enlarged fragmentary perspective view of an anti-squeak filler strip constructed in accordance with my invention.
Figures 4, 5, 6, 7, 8, 9:
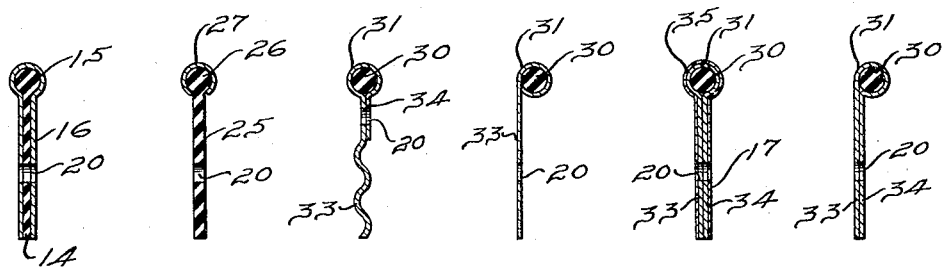
Fig. 4 is a cross-sectional view taken substantially along line 4—4 of Fig. 3.
Figs. 5 to 9 are cross-sectional views similar to Fig. 4, of other forms which my invention may assume.

In practicing my invention, a motor vehicle 10, having a body portion 11 and a fender 12, is provided with an anti-squeak filler strip 13, interposed between the body portion and the fender. As best shown in Figures 3 and 4 the filler strip 13 is provided with a fabric inner member 14, having an enlarged beaded portion 15, the fabric member being impregnated with a lubricating medium such as graphite. A thin flexible metallic member 16, substantially in cases the fabric member 14 and may be constructed of any flexible metal, such as aluminum or copper.

Figures 1, 2:
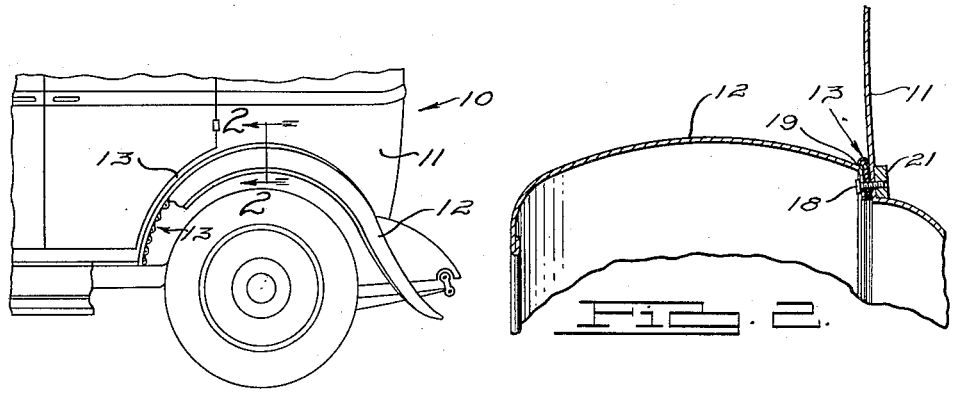
Fig. 2 is an enlarged cross sectional view taken substantially along line 2—2 of Fig. 1.

As best shown in Figure 2 the filler 13, interposed between the body portion 11 and the fender 12, is secured to the body portion, by means of stud bolts 18 extending through the fender, openings 20 in the filler and a body frame member 21. It will be observed that the bead portion 15 extends beyond the top edges of the fender, as indicated at 19, thus providing not only a filler that will prevent any foreign substance from entering between the fender 12 and the body portion 11, of the motor vehicle, but also a trimming which enhances the appearance of the motor vehicle. In securing the fender to the body portion, a portion of the graphite lubricating medium in the inner member 14 is forced through the openings 20 when the fender is bolted to the body portion, and around the stud bolts 18 thereby further sealing the joint.

Notches 17 are formed in the filler strip as shown by Figs. 1 and 3, to facilitate bending it into arcuate form as shown by Fig. 1.

Another form of the invention, as best shown in Fig. 5 comprises a fabric or rubber strip 25, having a beaded portion 26 and a metallic member 27 substantially incasing the beaded portion 26, but not the remainder of the strip. When the strip is in its operative position, the metal bead cover 27 substantially contacts with the fender and body of the vehicle.

According to Fig. 6, a filler is provided which comprises a cylindrical rib of rubber 30 encased by flexible metal 31 having a contacting flange 33 and 34 extending radially from the rib. The flange portion 33 terminates in a sineous wave contour for providing line contact between the members to be bonded together. The construction shown by Fig. 7 provides a filler, which comprises a cylindrical rib 30 encased by flexible metal 31 having a single contacting flange portion 33 extending substantially tangential of the rubber 30. Fig. 9 discloses a construction similar to Fig. 7 with the exception that two flange portions are provided. Fig. 8 illustrates a filler, which can be formed as disclosed by the above stated figures, with the exception that it is covered by a thin, protecting paper 35, which is employed to preserve the appearance of the metal finish on the filler prior to assembling it with the body of the vehicle.

From the foregoing description, it is apparent that by the employment of my invention I have provided a filler strip for motor vehicles that is more efficient and economical than the filler strips heretofore employed.

Although I have illustrated but the preferred forms which my invention may assume, and have described them in detail, it will be apparent to those skilled in the art that it is not so limited, but that various modifications and changes may be made therein without departing from the spirit of my invention, or from the scope of the appended claims.

I claim:

1. In combination in a motor vehicle, metal plates having linear portions disposed in closely adjacent relation, and other portions relatively diverging from such linear portions, and an anti-squeak filler strip comprising a thin metallic member disposed between such closely adjacent linear portions of the plates and having a hollow bead between and contacting with the diverging portions of the plates.

2. In combination in a motor vehicle, metal plates having linear portions disposed in closely adjacent relation, and other portions relatively diverging from such linear portions, an anti-squeak filler strip comprising a thin metallic member disposed between such closely adjacent linear portions of the plates, and having a hollow bead between the diverging portions of the plates, and a deformable filler material in such hollow bead portion.

3. In combination, in a motor vehicle, metal plates having linear portions disposed in closely adjacent relation, and other portions relatively diverging from said linear portions, an anti-squeak filler strip comprising a thin metallic member disposed between such closely adjacent linear portions of the plates and having a reversely folded hollow bead between and contacting with the diverging portions of the plates, and a filler for the hollow bead portion comprising a fibrous material.

4. In combination in a motor vehicle, metal plates having linear portions disposed in closely adjacent relation, and other portions relatively diverging from such linear portions, an anti-squeak filler strip comprising a thin metallic member disposed between such closely adjacent linear portions of the plates, and having a reversely folded hollow bead between the diverging portions of the plates, and a filler for the hollow bead portion comprising rubber compound.

5. In combination, in a vehicle, metal plates having linear portions disposed in closely adjacent relation, and other portions relatively diverging from such linear portions, an anti-squeak filler strip comprising a thin metallic member disposed between such closely adjacent linear portions of the plates, and having a reversely folded hollow bead between and contacting with the diverging portion of the plates, the portion of the strip between the linear portions of the plates having notches in its edge for facilitating bending the strip into the desired shape, and means connecting the plates comprising elements passing through apertures in the portion of the strip between the linear portions of the plate, and between the notches therein.

ORLEY J. CROWE.